United States Patent [19]

Wolk et al.

[11] 3,996,335
[45] Dec. 7, 1976

[54] DESULFURIZATION OF FUEL GAS AT HIGH TEMPERATURE USING SUPPORTED MOLTEN METAL CARBONATE ABSORBENT

[75] Inventors: Ronald H. Wolk, San Jose, Calif.; William C. Rovesti, Columbia, S.C.; Peter Maruhnic, Pennington, N.J.

[73] Assignee: Hydrocarbon Research, Inc., Morristown, N.J.

[22] Filed: Apr. 14, 1975

[21] Appl. No.: 567,635

[52] U.S. Cl. .......................... 423/210.5; 423/232; 48/206; 48/215
[51] Int. Cl.² ....................................... B01D 53/34
[58] Field of Search .......... 423/210.5, 232, 659 A; 48/215, 206

[56] References Cited
UNITED STATES PATENTS

| | | | |
|---|---|---|---|
| 1,831,731 | 11/1931 | Al ...................................... | 423/230 |
| 1,899,562 | 2/1933 | Dunn .............................. | 423/659 A |
| 3,511,595 | 5/1970 | Fuchs .............................. | 423/233 |
| 3,619,130 | 11/1971 | Ventriglio et al. ................ | 423/230 |
| 3,671,185 | 6/1972 | Lefrancois et al. ............ | 423/232 X |
| 3,865,924 | 2/1975 | Gidaspow et al. ................ | 423/230 |
| 3,919,390 | 11/1975 | Moore ............................ | 423/210.5 |

Primary Examiner—Earl C. Thomas

[57] ABSTRACT

Sulfur compounds contained in fuel gases produced from the gasification of coal or petroleum residua are removed at above about 1600°F temperature by contacting the gas with an absorbent material comprising a strong, macroporous particulate solid support containing molten metal carbonate, such as potassium carbonate, within its pores. Following such contacting and reaction of the sulfur compounds in the hot gas with the supported metal carbonate absorbent, it is regenerated by being contacted at high temperatures with steam and $CO_2$ to remove the sulfur, which is recovered as $H_2S$. The metal carbonate absorbent material is reused by again contacting it with the hot fuel gas for sulfur removal, after which the sulfur-free fuel gas is burned in a combustion process such as a gas turbine to produce power.

12 Claims, 2 Drawing Figures

DESULFURIZATION OF FUEL GAS AT HIGH TEMPERATURE USING SUPPORTED MOLTEN METAL CARBONATE ABSORBENT

BACKGROUND OF THE INVENTION

In the gasification of coal or petroleum residua to produce fuel gases having low to medium heating value, such as those burned in gas turbines for power production, a major problem is caused by the relatively high sulfur content of such gases. This sulfur must be substantially removed either from the hot fuel gas before combustion or from the stack gas after combustion in order to meet the present environmental pollution standards. Presently known processess for sulfur removal from such fuel gases require first cooling the gas to below about 600°–800° F for an absorption process and then usually reheating it to near the combustion temperature as in the gas turbine. This not only requires substantial heat exchange equipment and its accompanying undesirable expense, but also causes an undesirable reduction in overall thermodynamic efficiency of the process. Removal of sulfur from stack gases after combustion such as by lime scrubbing is also difficult and expensive because of the huge volumes of gas involved.

SUMMARY OF THE INVENTION

This invention pertains to the removal of sulfur from hot fuel gases such as that produced by the gasification of coal or petroleum residua, wherein the sulfur compounds contained in the fuel gas are substantially removed by contacting the gas at temperatures above about 1600° F with a sorbent material comprising a strong macroporous chemically resistant, thermally stable support material having dispersed within its pores a molten alkali metal carbonate having low vapor pressure, such as potassium carbonate, sodium carbonate or a similar salt compound. The hot fuel gas is contacted with the special particulate absorbent material in a reactor operating at about 1700°–2200° F temperature and at a commercially useful pressure of at least about 15 psig and as high as 600 psig, whereby the metal carbonate is substantially converted to the sulfide form. The resulting substantially sulfur-free product gas stream is withdrawn from the reactor and is available at elevated temperature and pressure as fuel to a combustion process such as a gas turbine unit. The reactor used is preferably a fluidized bed type so as to provide close temperature control of the reaction and reduced migration of the molten metal carbonate contained within the support material.

After absorbing sulfur from the hot fuel gas, the solid absorbent material may be regenerated by treating it with steam and $CO_2$ at elevated temperature sufficient to maintain the metal carbonate in the molten state so as to drive off the sulfur. In such a regeneration arrangement, a portion of the used solid absorbent material is preferably withdrawn from the fluidized bed reactor, regenerated by contacting it with steam and $CO_2$ so as to substantially convert the metal sulfide back to the carbonate form and produce a concentrated $H_2S$ gas stream. The regenerated absorbent is then returned to the reactor for reuse.

In an alternative arrangement, dual fixed absorbent bed type reactors may be used for contacting the hot fuel gas, with the gas being passed through one reactor for removal of sulfur therein while the alternate reactor is being regenerated by passing steam and $CO_2$ through it. After the absorbent bed in service becomes contaminated with sulfur, the two reactors are reversed and the freshly regenerated unit is placed in sulfur removal service and the contaminated absorbent if regenerated.

After the sulfur has been substantially removed from the hot fuel gas, the gas can advantageously be passed to a gas-solids separation step for solids removal. The cleaned gas can then be burned in a heat engine such as a gas turbine to produce industrial power. The resulting exhaust gas from the turbine (at reduced pressure and temperature) can then be further used as a heat source to produce process steam. When the hot fuel gas is derived from the gasification of coal or residual oil, the desired carbonate contacting pressure will usually be about 200–600 psig.

This absorbent material can be made by depositing about 10–18 weight percent of the metal carbonate such as potassium or sodium carbonate or mixtures thereof into the pores of an aluminum oxide carrier or support material having silicon content not exceeding about 2.0 weight percent and preferably not exceeding about 1.0 weight percent. Such metal carbonate impregnation of the carrier material can be accomplished by contacting the carrier with a saturated aqueous solution of the alkali metal carbonate followed by heating to above 300° F to convert the carbonate to the anhydrous form. The preferred metal carbonate is potassium carbonate.

DESCRIPTION OF THE PREFERRED EMBODIMENT

Figure 1:
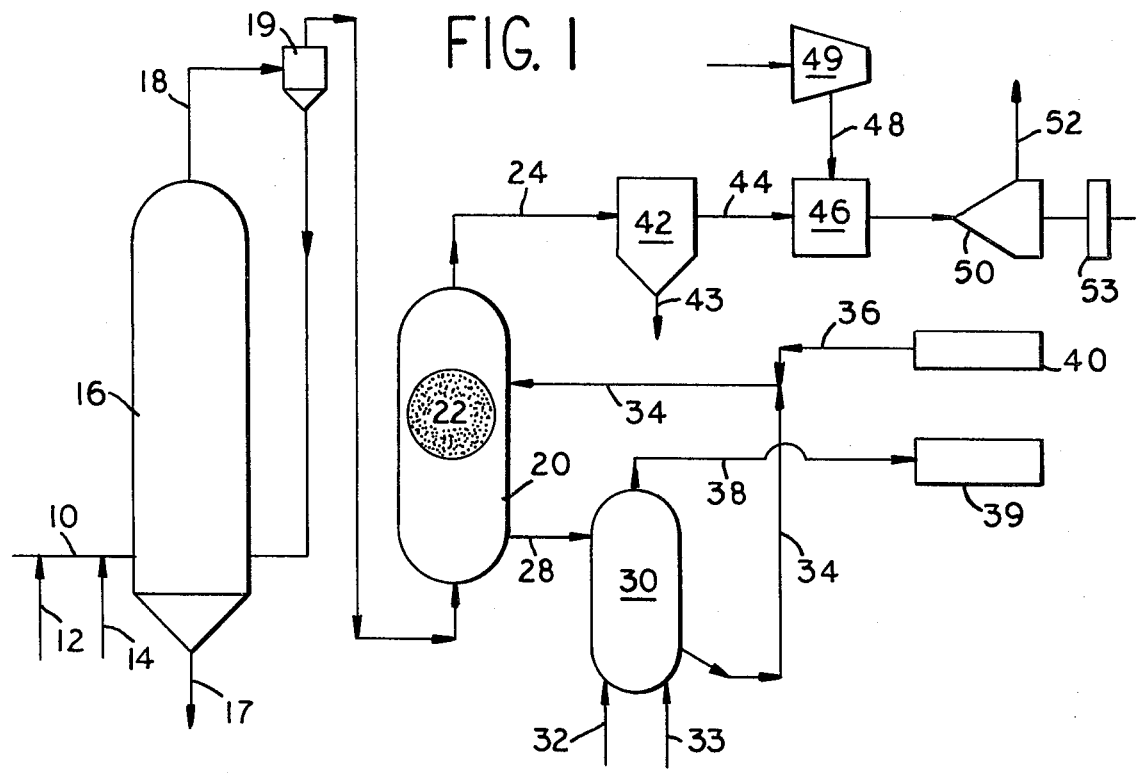
FIG. 1 is a schematic drawing of a process for sulfur removal from hot fuel gas wherein the absorbent is retained in a fluidized bed reactor and a portion is withdrawn for regeneration and returned to the reactor.

As shown in FIG. 1, carbonaceous material at 10 such as coal or oil, is fed together with pressurized steam 12 and oxygen-containing gas 14 to gasifier unit 16. Under conditions of controlled temperature and pressure and usually in the range of 1700°–2200° F and 200–600 psig, the coal is converted to a hot sulfur-containing fuel gas which is withdrawn at 18. Ash in particulate or slag form is removed from the gasifier at 17. Unreacted coal solids are removed in separator 19 and returned to the gasifier 16.

To remove the sulfur contained in this cleaned fuel gas stream 18, it is fed to a fluidized bed type reactor 20 which contains a strong abrasion-resistant porous particulate absorbent material 22, such as aluminum oxide having potassium carbonate dispersed within its pores. The usual conditions for reactor 20 are also about 1700°–2200° F temperature and about 200–600 psig pressure. Under such conditions, the sulfur compounds in the hot fuel gas are substantially reacted with the molten potassium carbonate within the pores of the particulate absorbent material to form potassium sulfide, and a substantially sulfur-free fuel gas product stream is withdrawn at 24. This gas has relatively low heating value (150–300 BTU/Ft$^3$) and is passed to gas-solids separation unit 42, from which particulate solids are removed at 43. The resulting clean hot gas stream 44 is suitable for use as a fuel gas for heat engines. As shown, it can be passed to combustor 46 of a gas turbine assembly where it is mixed with compressed air stream 48 from compressor unit 49. The resulting combustion gas is fed to turbine unit 50 for producing power at 53. The hot exhaust gas stream 52 from turbine 50 may be used as a heat source for secondary power generation or for producing process steam (not shown), or as hereinafter mentioned, as absorbent regenerating gas in regenerator 30.

As the capacity of the potassium carbonate contained in the pores of absorbent material 22 to react with sulfur compounds from the fuel gas becomes substantially depleted by the molten carbonate being converted to the sulfide form in reactor 20, the absorbent is then reactivated by withdrawing a portion of it from the fluidized bed 20 via conduit 28 and passing it to regeneration reactor 30. Here, the absorbent is reactivated in a fluidized bed with pressurized steam at 32 and $CO_2$ introduced at 33 in substantially equal volumes and which flow upwardly through the bed. The regeneration temperature in bed 20 is maintained sufficiently high so as to maintain the potassium sulfide in the spent absorbent in a molten condition, such as above about 1600° F or preferably at about 1700°–2000° F, and the potassium sulfide is substantially converted back to the carbonate form. The reactivated absorbent is then reintroduced into fluidized bed reactor 20 via conduit 34. Fresh make-up absorbent material 22 is added as necessary at 36 from absorbent preparation step 40. If desired, a portion of the hot turbine exhaust gas 52 containing $CO_2$ and steam may be introduced into the bottom of regenerator 30 to help regenerate the absorbent.

The sulfur recovered from the fuel gas in regeneration reactor 30 is withdrawn as $H_2S$ in stream 38. If desired, stream 38 may be further treated for recovery of the sulfur in sulfur recovery unit 39 using known means, such as the Claus process.

Although the sulfur removal reactor 20 is preferably the fluidized bed type because it is desirable to maintain a relatively constant temperature therein, it may be a moving bed type instead of the fluidized bed as shown. If a moving bed type reactor is used, the absorbent bed would usually move downwardly through the reactor as a bulk instead of having random motion of the particles as occurs in a fluidized type bed reactor. Also if desired, a mixture of potassium and sodium carbonate may be incorporated into the pores of the porous support material.

FIG. 1 is primarily designed for feed coal to gasifier 16 but residual oil containing over 0.5% sulfur can also be used as a feedstream to this process. For oil feed, the ash removal at 17 and solids separation steps at 19 and 42 could probably be eliminated.

Figure 2:
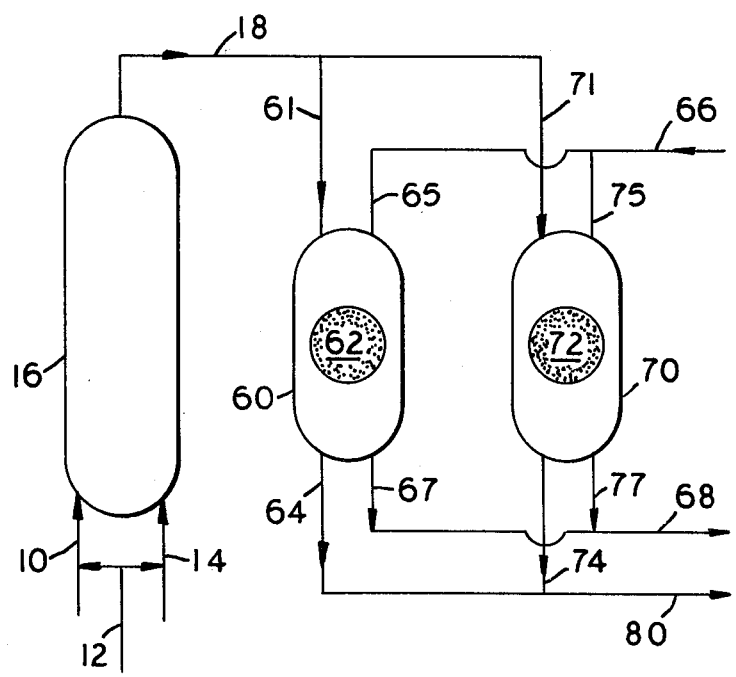
FIG. 2 is a schematic drawing of an alternative process for sulfur removal from hot fuel gas utilizing dual fixed beds of particulate absorbent, and arranged for periodic regeneration of the absorbent in the unused bed.

This invention is preferably utilized for sulfur removal in a fluidized bed type reactor as described in FIG. 1. It can also be utilized in dual fixed bed type reactors as generally illustrated in FIG. 2. As previously described, hot fuel gas stream 18 from gasifier 16 is passed via line 61 to fixed bed type reactor 60 containing porous absorbent material 62 for removal of sulfur from the gas. The usual operating conditions for this reactor are 1700°–2200° F temperature and 200–600 psi pressure. A substantially sulfur-free fuel gas product stream is withdrawn at 64 for use as a low heating value fuel gas stream 80.

As the capacity of the absorbent material 62 in reactor 60 to remove sulfur becomes substantially depleted due to the molten metal carbonate contained in the absorbent pores being converted to the sulfide form, the fuel gas stream 18 is diverted through conduit 71 to the alternate fixed bed reactor 70 containing porous absorbent material 72. A substantially sulfur-free gas stream is removed at 74 as before.

Concurrently, hot regenerating gas stream 66 containing steam and $CO_2$ is passed to reactor bed 62 at temperature of 1700°–2200° F to convert the molten potassium sulfide in the absorbent pores back to the potassium carbonate form. The resulting sulfur-containing gas is removed through line 67 or line 77 as stream 68, which may be passed to a sulfur recovery unit 39 (not shown) as mentioned previously. Similarly, when the capacity of absorbent bed 72 in reactor 70 to remove sulfur from stream 18 is substantially depleted, the fuel gas is again passed through regenerated bed 62 for sulfur removal therein, while reactor bed 72 is regenerated as previously described.

This invention will be more fully explained by the following examples illustrating operations using the absorbent material for removing $H_2S$ from gas mixtures containing same, and for making the metal carbonate supported absorbent material.

EXAMPLE I

A series of runs were made for removing $H_2S$ from a gas mixture containing same and utilizing a particulate absorbent material comprising molten potassium carbonate supported on porous alumina pellets having low surface area and impregnated with about 10–18 percent $K_2CO_3$ from aqueous solution.

The supported metal carbonate absorbent material (made as described hereinafter) was dried at above 300° F to remove the water of hydration and then charged into a reactor tube made of pure, high density, recrystallized alumina and heated in a horizontal tube furnace. The absorbent occupied a central hot zone in the middle of the reactor tube and the inlet and outlets ends were packed with a high density, non-porous, tabular alumina. Gas mixtures comprising five volume percent $H_2S$ in hydrogen were then fed into the heated reactor through a common inlet connection. The presence of $H_2S$ in the reactor exit gas was detected by bubbling the gas through an aqueous solution of $CdSO_4$, as the formation of CdS through reaction with $H_2S$ acts as a very sensitive indicator for the presence of this gas. The volume of gas processed was measured by water displacement. Eventually all of the $H_2S$ was removed from the feed gas stream as a result of contact with the absorbent.

The alumina support material A used for the initial runs was Norton type BA-5205 low surface area (<1 $M^2/g$), macroporous catalyst carrier having nearly all of its 0.35 cc/g of pore volume in pores between 100 and 1,500 microns ($10^4$ angstroms) in diameter. These ¼-inch diameter support spheres had an alumina content of 84.7 weight percent and a silica content of 13.4 weight percent, with the remaining 2.1 percent comprising mainly iron, titanium, sodium and potassium oxides. Physical degradation of the support material was observed after the absorbent was regenerated with carbon dioxide and steam. It is believed that the molten carbonate reacted with the high proportion of silica in the support, thus weakening the structure of this material.

EXAMPLE II

A modified alumina support material B containing only 0.4 percent $SiO_2$, identified as Norton type LA-956 low surface area alumina comprising 0.4 percent $SiO_2$ and 99.3 percent $Al_2O_3$ was also used. These ⅛-inch by ⅛-inch pellets had a total pore volume of about 0.17 cc/g, most of which was in pores of diameter between 1.0 and 10 microns ($10^4$ angstroms). Although partial migration of the hot carbonate melt from the alumina support material in the high temperature zone to the cooler tabular alumina packing was observed, this alumina support material showed no signs of having undergone any detectable physical degradation when the run was completed.

It was concluded that the alumina support material used for this invention should contain not more than about 2.0 weight percent silica and preferably not over about 1.0 weight percent silica to avoid attack by the molten carbonate material.

The supported carbonate absorbent was regenerated by passing equal volumes of $CO_2$ and steam through the packed bed at 1750° F until all evolution of $H_2S$ ceased. After regeneration, $CO_2$ was passed through the reactor to remove any water from the system. Again, the same 1.2% $H_2S$ in hydrogen gas mixture was passed through the reactor. Initially, only 24 percent $H_2S$ removal was achieved at the low flow rate of 0.13 SCFH; however, the rate of removal increased with the amount of gas processed until, at 0.63 SCFH and 1.2 SCF total flow, about 62 percent $H_2S$ was being removed. Despite the extensive drying of the absorbent with $CO_2$ gas prior to introduction of the $H_2S$ hydrogen gas mixture, considerably more water was condensed in the lines downstream of the reactor during the processing of the first few tenths of a SCF of gas mixture than was observed during the 95 percent conversion conditions run earlier. Furthermore, after this excessive water formation ceases, the rate of $H_2S$ removal increased from 24 percent to 62–63 percent. Therefore, it appears that the potassium sulfate $K_2SO_4$ that is formed during the regeneration reacts with hydrogen to form the sulfide and water, and this conversion appears to make the carbonate melt more reactive for $H_2S$ removal.

EXAMPLE III

To illustrate the utility of this invention for removing $H_2S$ from a typical fuel gas derived from the gasification of coal, a gas having the principal constituents shown in the following tables, when passed over a treated support material as described, will when operated under the prescribed conditions, produce characteristic results as noted.

TABLE I

| GAS COMPOSITION | |
|---|---|
| $H_2$ | 18–28.6 V % |
| $N_2$ | 5.0–6.7 V % |
| CO | 9.0–13.7 V % |
| $CH_4$ | 8.0–13.6 V % |
| $CO_2$ | 15–35.0 V % |
| $H_2O$ | 10–40 V % |
| $H_2S$ | 0.5–1.7 V % |

TABLE IA

| Support Material Composition | Low Surface Area Alumina Norton Type LA-956 |
|---|---|
| $Al_2O_3$, W % | 99.3 |
| $SiO_2$, W % | 0.4 |
| Pellet Size, Inch | ⅛" × ⅛" |
| Total Pore Volume, cc/gm. | 0.17 |
| Impregnating Material | |
| $K_2CO_3$ | 12.6 W % |

TABLE IB

| OPERATING CONDITIONS | |
|---|---|
| The operating conditions for the fluidized bed reactor are listed below: | |
| Reactor Temperature, ° F | 1700–1800 |
| Reactor Pressure, psig | 300–600 |
| Space Velocity, $V_g/Hr/V_r$ | 100–500 |
| $H_2S$ Removed, V % | 62–98 |

After the molten potassium carbonate contained in the particulate absorbent is substantially converted to potassium sulfide form by removal of $H_2S$ in the fuel gas, the flow of gas through the reactor is interrupted. The absorbent is then regenerated by passing a hot gas comprising $CO_2$ and steam in substantially equal parts through the bed at a temperature slightly lower than the carbonate reaction temperature and yet sufficient to retain the metal carbonate in molten form. The regeneration is continued until the metal sulfide in the pores of the support material has been substantially converted back to its carbonate form, after which the flow of the regenerating gas if terminated. The reactor is then ready for reuse in processing additional fuel gas for the removal of sulfur dioxide therefrom.

The absorbent material useful in this invention comprises a metal carbonate such as potassium or sodium carbonate deposited within the pores of a strong porous support material such as alumina. To prevent corrosive attack of the alumina support by the molten carbonate, the alumina should be of high purity and have low silica content, such as not exceeding about 2.0 weight percent silica.

The alumina should be impregnated with the metal carbonate from aqueous solution by dissolving one part $K_2CO_3$. 1-½ $H_2O$ in one part water at room temperature. Sufficient solution should be prepared to equal about 1-½ times the volume of solid support material to be impregnated. Place the support material in a basket made from 100 mesh stainless steel screen, shaped to fit inside a glass beaker. Soak the support material in the salt solution for one hour, allow it to drain, and then dry at 220° F for 4 hours. Repeat the soaking and drying steps. Finally, calcine in air at above 300° F and preferably above 900° F for 16 hours to remove the water of hydration.

Depending on the porosity of the support material, this procedure will deposit 10 to 18 percent by weight or more of the metal carbonate salt on the porous support material. The absorbent material is now ready to be placed in a reactor and used for removing $H_2S$ from a fuel gas containing same.

Although we have disclosed certain preferred embodiments of our invention, we are aware that modifications may be made thereto within the spirit and scope of the disclosure and as defined solely by the appended claims.

What is claimed is:

1. A process for removing hydrogen sulfide from a fuel gas mixture comprising the steps of:
   a. contacting the fuel gas mixture in a reaction zone with a particulate porous refractory material containing a molten alkali metal carbonate interspersed in the pores of the refractory material, the reaction zone being maintained at a temperature above melting point of the metal carbonate, and pressures between about 15 and 600 psig, the refractory material being substantially non-reactive with the metal carbonate at said temperature, and having a $SiO_2$ content less than 2.0 weight percent, whereby the hydrogen sulfide in the gas mixture chemically reacts with the metal carbonate, thereby forming a metal sulfide;
   b. withdrawing from the reaction zone a low sulfur-containing gas stream;
   c. removing a portion of the refractory material from contact with the fuel gas; and
   d. regenerating the refractory material with $CO_2$ and steam at temperatures above the melting point of the metal sulfide but below the temperature at which metal sulfide formation is kinetically favored, thereby converting the metal sulfide to a metal carbonate for reuse.

2. The process of claim 1, wherein the temperature in the reaction zone is between about 1700° and 2200° F and the pressure is between about 200 and 600 psig.

3. The process of claim 1, wherein the reaction zone comprises a fluidized bed, the particulate contact material being maintained in a fluidized condition during hydrogen sulfide removal.

4. The process of claim 2, wherein the metal carbonate is selected from the group consisting essentially of potassium carbonate, sodium carbonate and mixtures of sodium carbonate and potassium carbonate.

5. The process of claim 1, wherein the hot fuel gas is passed sequentially to a dual fixed bed, the fuel gas being passed through one bed to remove hydrogen sulfide while the alternate bed is being regenerated.

6. The process of claim 1, wherein the pores of the refractory material contains between 10–18 weight percent metal carbonate.

7. The process of claim 1 wherein a fuel gas mixture is derived from the gasification of a carbonaceous material.

8. Process of claim 7, wherein the carbonaceous material is coal.

9. Process of claim 7, wherein the carbonaceous material is residual oil.

10. The process of claim 1, wherein the porous refractory material is alumina having a silica content less than 2.0 weight percent and a porosity of at least 0.10 cc/gm.

11. A process for removing hydrogen sulfide from a fuel gas mixture comprising the steps of:
    a. contacting the fuel gas mixture in a fluidized reaction zone with a particulate porous refractory material containing between 10–18 weight percent of a molten metal carbonate selected from the group consisting essentially of potassium carbonate, sodium carbonate and mixtures thereof, interspersed in the pores of the refractory material, the reaction zone being maintained at temperatures between 1700° and 2200° F and pressures between 200 to 600 psig, the refractory being substantially nonreactive with the metal carbonate at said temperature having a $SiO_2$ content less than 2.0 percent by weight, whereby the hydrogen sulfide in the gas mixture chemically reacts with the metal carbonate, thereby forming a metal sulfide;
    b. withdrawing a low sulfur-containing gas stream from the reaction zone;
    c. removing the converted metal sulfide from contact with the fuel gas;
    d. regenerating the refractory material with carbon dioxide and steam at temperatures between 1700° and 2200° F whereby the metal sulfides are converted to a metal carbonate form for reuse.

12. In a process for the production of fuel gas for combustion in a gas turbine unit by the gasification of a sulfur containing carbonaceous material producing a high temperature sulfur containing gas, the improvement comprising steps of:
    a. contacting the fuel gas mixture in a reaction zone with a particulate porous refractory material containing a molten alkali metal carbonate interspersed in the pores of the refractory material, the reaction zone being maintained at a temperature above melting point of the metal carbonate, and pressures between about 75 and 600 psig, the refractory material being substantially non-reactive with the metal carbonate at said temperature, and having a $SiO_2$ content less than 2.0 weight percent, whereby the hydrogen sulfide in the gas mixture chemically reacts with the metal carbonate, thereby forming a metal sulfide;
    b. removing a fuel gas of lower sulfur content from the contacting step and at substantially the same temperature as the entrance temperature of the sulfur containing gas.

* * * * *